United States Patent [19]

Stokes

[11] Patent Number: 4,849,278

[45] Date of Patent: Jul. 18, 1989

[54] FLEXIBLE, DURABLE, STRETCHABLE PAPER BASE WEB

[75] Inventor: Bruce G. Stokes, Woodstock, Ga.

[73] Assignee: Kimberly-Clark Corporation, Neenah, Wis.

[21] Appl. No.: 770,336

[22] Filed: Aug. 27, 1985

[51] Int. Cl.$^4$ .............................................. B41M 3/12
[52] U.S. Cl. .................................. 428/153; 428/167; 428/172; 428/219; 428/342; 428/512; 428/537.5
[58] Field of Search ............... 428/153, 354, 211, 514, 428/219, 167, 172, 342, 512, 537,

[56] References Cited

U.S. PATENT DOCUMENTS 2,941,661  6/1960  Picard et al. ........................ 206/59

OTHER PUBLICATIONS

HYCAR Service Bulletin 6902.

*Primary Examiner*—Ellis P. Robinson
*Assistant Examiner*—P. R. Schwartz
*Attorney, Agent, or Firm*—William D. Herrick

[57] ABSTRACT

A flexible and durable paper-based web particularly useful as label stock for flexible, squeezable containers. The paper web includes a substrate containing cellulose papermaking fibers. The substrate contains a fine crepe pattern that has been subjected to pressure to smooth the substrate surface. The substrate also contains as a saturant between about 15 and 75 parts by weight per 100 parts of fiber of a soft polymer saturant characterized by a glass transition in temperature from about −45° C. to 0° C. The resulting saturated substrate has a flexibility in the range of from about 10 mg. to 50 mg. generally and an elongation in the range of from about 15% to 35% generally with a Sheffield smoothness in the range of from about 20 to 250 generally. These properties are unique in a paper web and provide highly beneficial results in use as labels which may be repeatedly flexed on a squeezable container without wrinking. In use as a label the web preferably contains a print receptive coating on one side and adhesive coating on the opposite side. The method of the invention includes the steps applying the fine crepe patter to the paper-based substrate, saturating the substrate, and calendering it to improve the surface smoothness. Additional steps, particularly for label applications will include coating with a print receptive coating and the adhesive coating on opposite sides.

5 Claims, 1 Drawing Sheet

FLEXIBLE, DURABLE, STRETCHABLE PAPER BASE WEB

BACKGROUND OF THE INVENTION

1. Field of the Invention

This invention relates to paper based webs that are particularly suited for applications as label stock for flexible containers. Examples include condiment dispensers and bottles for various materials such as shampoo, hand cream, contact lens solutions or the like. Such labels must not only be durable since for many applications the containers will be reused or will be used over an extended period, but must also be capable of flexing and stretching to accommodate the pressure applied to the container. Such labels will also necessarily be printable to contain desired indicia and, for that purpose, will preferably have a smooth and ink receptive surface. Other applications for the durable, extensible webs of the present invention will be apparent to those skilled in the art.

2. Description of the Prior Art

Conventional labels for squeezable containers are either made from paper substrates, in which case they are subject to wrinkling, cracking, or defacing upon use, or made from plastic films which are considerably more expensive and may require special printing inks. Accordingly, it is desired to provide a paper based label stock that meets the stretchability, durability and elongation requirements for squeezable bottle labels and which also presents a smooth, printable surface. Various conventional materials meet these criteria individually, but paper-based products fulfilling all of these requirements to a high degree are not commercially available so far as is known.

SUMMARY OF THE INVENTION

The present invention is directed to an improved flexible and durable paper-based web that comprises a substrate of cellulose papermaking fibers. The substrate contains a fine crepe pattern that has been subjected to pressure as by calendering to smooth the substrate surface. The substrate is saturated with a soft, stretchy polymer saturant in a range of from about 15 to 75 parts by weight per hundred parts of fiber weight. The result is a paper-based web that is highly durable and flexible with an elongation of at least about 15%, but presenting a printable surface having a Sheffield smoothness of about 250 or less. Such webs when printed on one side may have a pressure sensitive or solvent or water-activated adhesive applied to the opposite side, and the result is a label meeting the requirements for use with squeezable containers such as those for condiments, shampoo, or the like. Preferred embodiments include those where the cellulose fibers are long fiber Kraft fibers and where the saturant is a soft, acrylic polymer having a Tg in the range of from −45° C. to 0° C. In the process of the present invention the web of papermaking fibers is preferably creped in a semi-dry state having a moisture content in the range of from about 35 to 55 percent by weight based on total weight of water plus fiber. The fine crepe pattern is characterized by 30 to 100 lines of crepe per linear inch measured in the machine direction with the opposite side having a predominantly planar surface with small discontinuous cavities or cups. After creping, the web is preferably saturated with the soft polymer and steel or supercalendered, coated with a conventional print receptive label coating and then supercalendered to produce the smooth, flexible, extensible, durable paper web of the invention.

DESCRIPTION OF THE PREFERRED EMBODIMENTS

Figure 1:
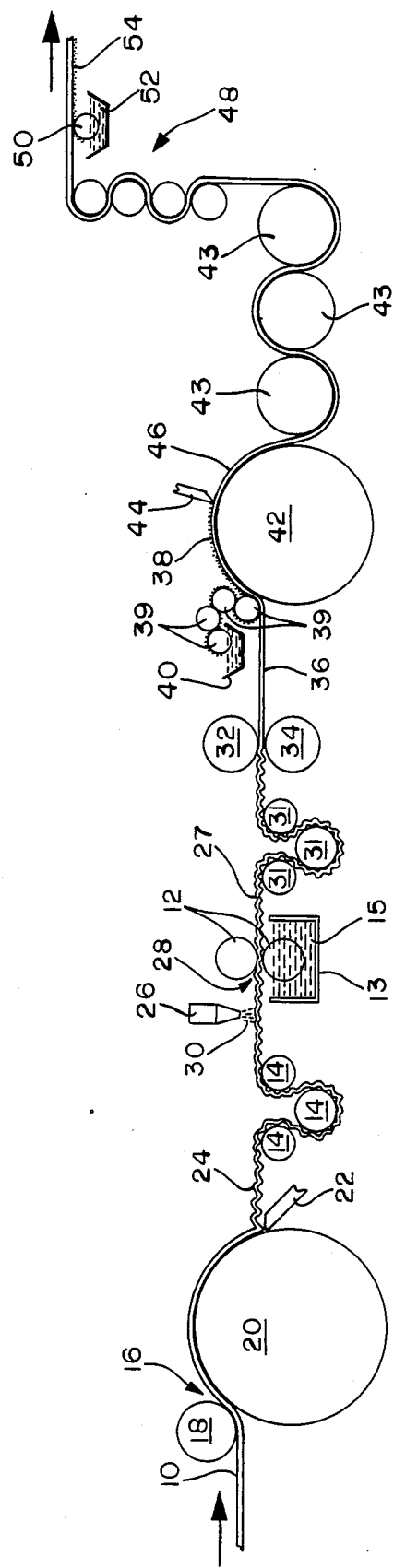
FIG. 1 illustrates in schematic form one embodiment of the method of the present invention.

While the invention will be described in connection with preferred embodiments, it is will be understood that it not intended to limit the invention to those embodiments. On the contrary, it is intended to cover all alternatives, modifications, and equivalents as may be included within the spirit and scope of the invention as defined by the appended claims.

For purposes of describing the present invention, the following tests have been carried out:

Flexibility was determined by Gurley stiffness tester model #4171 (W. and L. Gurley Company). In accordance with this procedure the instrument was calibrated by adjusting the legs to level indicated by the pointer reading "0" when loaded with a test sample and 5 gram weight. Test specimens were 1 inch by 1 inches in dimensions and conditioned for 12 hours at 50% relative humidity and 73.4° F. prior to testing. Four samples in each of the machine and cross machine directions were tested. Each sample was clamped centrally and seated so that the bottom edge was parallel to the top of the vane. The weight was attached to the bottom of the pointer at a position 1 inch from the center, and the control switch pressed driving the arm. The reading was taken at the maximum scale reading where the sample cleared or was about to clear the vane. An average of four readings was obtained and multiplied by the conversion factor 11.1.

Elongation was determined by Instron test equipment applied to the finished label stock. The soft polymer properties are selected so as to provide an elongation of at least about 15% without breaking in the final web.

Smoothness was determined by using a Sheffield three column Precisionaire instrument (Vendex Corporation). The procedure was as described in TAPPI Useful Method 518 with the sample placed on a glass plate in the Smoothcheck unit with the side to be measured facing up. The test head was gently lowerd onto the sheet and the smoothness read at the top of the float in column 1, 2, or 3 as appropriate. The readings were taken three times and averaged.

Tensile strength was measured in accordance with TAPPI TEA 494 om-81. Three samples were tested and the average reported in the table below. An Instron Model 1122 tensile tester (Instron Limited) constant rate elongation type was used. The test samples were 15 mm wide and 10 cm long. The tensile was reported as kilograms of force required to break the sample across the 15 mm direction.

Stretch was determined using an Instron Model 1122 tensile tester (Instron Limited) with the sample prepared in the same manner as for the tensile test. The gauge length indicator was set to a gap of 10 cm. A head speed of 30 cm/min. was selected and the test strips centered in both jaws and clamped at the upper jaw. The lower jaw was centered and the test switch activated with the reading taken as the sample broke. The result was reported as an average of sample readings and percent of stretch measured at break.

Polymer Softness was determined by glass transition temperature as in the range of from −45° C. to 0° C.

The paper substrate for use in accordance with the present invention may be selected from a wide variety of papers as will be apparent to those skilled in this art. Such papers, will, however, be predominantly composed of cellulose papermaking fibers, preferably long fiber Kraft fibers, although other additives conventionally used in papermaking may be included. Examples of such additives are various fillers such as titanium dioxide, clay, and the like. The basis weight of the paper web will vary widely depending upon the particular application, but normally will be in the range from about 30 grams per square meter to 75 grams per square meter and, for most label applications, preferably will be in the range from about 35 grams per square meter to 60 grams per square meter.

The saturating composition will be applied in a range of from 15 to 75 parts by dry weight per 100 parts of fiber and include from about 50 to 100 percent by weight, of total dry solids preferably 65 to 85 percent by weight of total dry solids of a soft, stretchy polymer having a glass transition temperature in the range of from about −45° C. to 0° C. and capable of being dispersed or dissolved in an impregnating composition. Examples of such polymers include acrylics such as Hycar® 26104 and 26083 available from B. F. Goodrich. The acrylics are preferred because of resistance to discoloration, oxidation, and degradation. The saturant composition may also include mixtures of such polymers that are compatible in the saturating composition as well as other ingredients such as fillers including titanium dioxide and clay up to an amount of about 50%, by total weight, preferably up to an amount of 33% by weight. Other additives such as antioxidants, pigments and the like may also be included. The saturant composition may be applied as a latex or from solution as will be understood by those skilled in this art.

When used for label applications, for example, the paper web may have applied thereto a print receptive coating on the surface to be printed. The coating may be any of a number of conventional label stock coatings and may include, for example, clays and titanium dioxide in a binder such as polyacrylate, polyvinyl acetate, styrene-butadiene rubber, and starch. Other useful such coatings will be apparent to those skilled in the art. The coating is generally useful in a range of about 7 grams per square meter to 55 grams per square meter but, preferably, for label applications will be applied in a range of from about 15 grams per square meter to 40 grams per square meter.

The side opposite the printing surface, for label applications, will normally have an adhesive applied thereto. The selection of a particular adhesive will depend upon the surface to be contacted as well as other factors such as cost and durability requirements. Such adhesives may be pressure sensitive adhesives such as acrylics, styrene-isoprene (Krayton® available from Shell Chemical Co.), styrene-butadiene, and natural rubber, solvent or moisture activated adhesives such as starch, dextrin or animal glue, or hot-melt pressure sensitive adhesives such as National Starch 70-9475, a compounded styrene isoprene. For label uses to be applied to flexible polyvinyl chloride or polyethylene bottles, the latter adhesive is preferred. The amount of adhesive necessary will depend on the particular adhesive and end use, as will be apparent to those skilled in the art, but, generally, it will be in the range of from about 15 grams per square meter to 30 grams per square meter for most applications, and preferably 20 grams per square meter to 25 grams per square meter.

Turning to FIG. 1, a preferred method in accordance with the invention for making the high stretch, smooth, flexible, printable paper web of the invention will be described. Base paper web 10 composed predominantly of papermaking cellulose fibers may be received from a conventional Fourdrinier paper machine at a described moisture level. This will include water in the range, broadly, from about 35 to 55 percent by total weight of the web including fiber and water, preferably in the range from about 40 to 50% by total weight. The web 10 is then directed to nip 16 between guide roll 18 and creping roll 20. Blade 22 on roll 20 applies a fine crepe (exaggerated for purposes of illustration) to the web. This fine crepe may be broadly in the range of from about 30 to 100 lines of crepe per linear inch measured in the machine direction with a preferred range of from about 40 to 80 lines per inch. The opposite side will preferably have a predominantly planar surface with small, discontinuous cavities or cups as described more fully in U.S. Pat. No. 2,941,661 to Picard and Swedish dated June 21, 1960, which is incorporated herein by reference, depending upon the degree of stretch desired. Preferably for label applications the crepe will be in the range of from 40 to 80 lines per linear inch. This finely creped web 24 is dried by contact with one or more heated drums 14 and has applied thereto saturating composition 30 by spray nozzle 26. The amount of saturant is controlled by passing through nip 28 between metering rolls 12. Drip pan 13 collects excess saturant 15 for discharge or recycle. The creped and saturated web 27 is then dried by contact with one or more heated drums 31 and calendered by passing between calender rolls 32 and 34 which may be of unloaded steel construction, or the web may be supercalendered at a pressure of 1400 psi, for example. In accordance with the invention, this calendering reduces the crepe height and improves surface smoothness while retaining to a high degree the stretch properties of the crepe. Calendered web 36 is then coated by running against coating roll 42 which has associated therewith coating 38 from dip pan 40 by means of coating rolls 39. The coating weight is controlled by blade 44, and the coated web 46 is dried by dryer cans 43 and then preferably supercalendered at calender stack 48 and, for label applications, the web preferably has adhesive 52 applied as coating 54 by means of applicator roll 50 to the surface opposite the coating applied at 38. It will be apparent to those skilled in this art that this process is subject to variation depending upon the particular application and properties desired for the resulting web.

EXAMPLES

Example 1

A Fourdrinier machine produced northern softwood Kraft pulp paper having a basis weight of 47 grams per square meter was creped with a fine crepe average of 73 lines per linear inch and dried. This web was saturated as shown in FIG. 1 by applying about 50 parts per hundred parts of fiber of the following saturant.

| SATURANT | |
|---|---|
| MATERIAL | DRY PARTS |
| Hycar 26104 (carboxy modified heat reactive polyethyl acrylate, Tg −15° C., low molecular weight) | 75 |
| Hycar 26083 (carboxy modified heat reactive polyethyl acrylate, Tg −15° C., higher molecular weight) | 25 |
| Abex 185 (polyoxyethylene fatty acid condensate) | 1 |
| Nopcote DC-100A (ammonium stearate) | 0.8 |
| TiO₂ R900 | 15 |
| Ultra White 90 Kaolin Clay | 15 |

The saturated web was dried and supercalendered at a pressure of about 1400 p.s.i. and coated with 29 grams per square meter of a print receptive label coating composition as follows:

| COATING | |
|---|---|
| MATERIAL | DRY PARTS |
| Ultra White 90 Kaolin Clay | 91.6 |
| TiO₂ R900 | 8.9 |
| Hycar 26084 (styrene modified heat reactive polyacrylate) | 16.25 |

To this coated structure, a pressure sensitive hot-melt adhesive (National Starch 70-9475) was applied at a weight of 24 grams per square meter to the backside of the web. The resulting product was formed into label size samples and applied to flexible polyvinyl chloride and polyethylene bottles. These bottles were squeezed and flexed repeatedly without forming wrinkles or tears in the label. For comparison, a commercially available, latex saturated paper label, was found to wrinkle after only a couple squeezes.

Examples 2-4

Example 1 was repeated using different basis weights, saturant and crepe levels as indicated and with the results shown in the Table below.

TABLE

| Example | 1 | 3 | 2 | 4 | Control |
|---|---|---|---|---|---|
| Basis wt #1300 sq ft | 26.9 | 23.3 | 23.4 | 20.5 | 23.3 |
| Caliper mils | 3.5 | 3.0 | 3.0 | 2.7 | 3.3 |
| Crepe, lines/linear inch | 69 | 69 | 74 | 74 | |
| Tensile MD | 19.6 | 19.2 | 16.9 | 10.9 | 24.2 |
| lb/in CD | 12.8 | 11.7 | 10.9 | 10.3 | 20.5 |
| Saturant Level, parts/100 | 50 | 20 | 50 | 20 | 20 |
| % Stretch MD | 19.2 | 17.0 | 24.7 | 19.9 | 2.7 |
| CD | 11.0 | 7.6 | 10.5 | 7.9 | 7.4 |
| Elmendorf Tear MD | 75 | 68 | 61 | 84 | 58 |
| g/16 Shts CD | 52 | 55 | 45 | 55 | 55 |
| Sheffield Smoothness | 167 | 108 | 230 | 128 | 60 |
| Gurley Stiffness MD | 24.0 | 22.1 | 16.3 | 16.9 | 79.9 |
| Mg CD | 25.2 | 21.9 | 18.4 | 18.4 | 42.3 |

In accordance with the invention it has been found that paper webs may be produced having a combination of properties including elongation in the range of from about 15% to 35%, preferably 18% to 30%, flexibility in the range of from about 10 mg. to 50 mg. preferably 15 mg. to 25 mg, and Sheffield smoothness in the range of from about 20 to 250, preferably 20 to 150. Other paper webs heretofore available for such applications have been deficient in at least one of these respects, and the web and process of the present invention are uniquely suited for producing webs for squeezable label applications having these desirable property characteristics.

Thus it is apparent that there has been provided in accordance with the invention, an improved paper web and method of making, yet fully satisfy the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims.

I claim:

1. A flexible, stretchable, smooth, durable paper web comprising,
    (a) a substrate having a basis weight in the range of from about 30 to 75 gsm comprising cellulose paper making fibers,
    (b) said substrate containing a fine crepe pattern in the range of from about 69 to 100 lines per linear inch that has been subjected to supercalendering pressure to smooth the substrate surface,
    (c) said substrate containing as a saturant between about 15 to about 75 parts per 100 parts by weight based on the fiber weight of a polymer characterized by a glass transition temperature in the range of −45° to 0° C.,
whereby said saturated substrate has a flexibility in the range from about 10 mg to 50 mg, and an elongation in the range of from about 18% to 30%, and Sheffield smoothness of in the range of from about 20 to 250.

2. The paper web of claim 1 further including a print receptive coating applied to one surface in a weight range of from about 7 gsm to 55 gsm.

3. The paper web of claim 1 or 2 further including an adhesive coating applied to a surface in the range from about 15 gsm to 30 gsm.

4. The paper web of claim 3 wherein the basis weight is in the range of from about 35 gsm to 60 gsm, the saturant comprises an acrylic polymer, and the adhesive comprises a pressure sensitive hot melt.

5. A flexible and durable label particularly adapted for use with squeezable containers comprising,
    (a) a substrate having a basis weight in the range of from about 30 gsm to 75 gsm comprising cellulose papermaking fibers,
    (b) said substrate containing a fine crepe pattern in the range of from about 69 to 100 lines per linear inch that has been subjected to supercalendering pressure to smooth a substrate surface,
    (c) said substrate containing as a saturant between about 15 to 75 parts per hundred parts of fiber weight of an acrylic polymer characterized by a Tg in the range of from about −45° to 0° C.,
    (d) on one surface of said web a surface coating in the range of from about 7 gsm to 55 gsm, by weight of a print receptive composition,
    (e) on the surface opposite said print receptive coating, a hot melt adhesive coating in the range of from about 15 gsm to 30 gsm,
whereby said label has a flexibility in the range of from about 10 mg to about 50 mg, elongation in the range of from about 18% to 30%, and Sheffield smoothness in the range of from about to 20 to 250.

* * * * *

UNITED STATES PATENT AND TRADEMARK OFFICE
CERTIFICATE OF CORRECTION

PATENT NO. : 4,849,278

DATED : July 18, 1989

INVENTOR(S) : Bruce G. Stokes

It is certified that error appears in the above-identified patent and that said Letters Patent is hereby corrected as shown below:

Column 2, line 25, "1 inches" should read --1½ inches--;

Column 2, line 11, "it is will" should read --it will--;

Column 2, line 12, "that it not" should read --that it is not--; and

Column 4, line 11, "described moisture" should read --desired moisture--.

Signed and Sealed this

Sixteenth Day of June, 1992

Attest:

DOUGLAS B. COMER

*Attesting Officer*   *Acting Commissioner of Patents and Trademarks*